United States Patent
Simpson

(10) Patent No.: US 11,465,067 B2
(45) Date of Patent: Oct. 11, 2022

(54) EVAPORATION STILL AND ASSOCIATED METHODS OF PRODUCING SALT

(71) Applicant: GRENADINE SEA SALT, LTD, Bequia (VC)

(72) Inventor: Gerald Simpson, Green Cove Springs, FL (US)

(73) Assignee: GRENADINE SEA SALT, LTD, Bequia (VC)

(*) Notice: Subject to any disclaimer, the term of this patent is extended or adjusted under 35 U.S.C. 154(b) by 0 days.

(21) Appl. No.: 17/196,455

(22) Filed: Mar. 9, 2021

(65) Prior Publication Data

US 2021/0283526 A1 Sep. 16, 2021

Related U.S. Application Data

(60) Provisional application No. 62/987,531, filed on Mar. 10, 2020.

(51) Int. Cl.
| | | |
|---|---|---|
| *B01D 3/02* | (2006.01) | |
| *B01D 1/00* | (2006.01) | |
| *C01D 3/06* | (2006.01) | |
| *B01D 5/00* | (2006.01) | |

(52) U.S. Cl.
CPC ............ *B01D 3/02* (2013.01); *B01D 1/0035* (2013.01); *B01D 5/006* (2013.01); *B01D 5/0015* (2013.01); *C01D 3/06* (2013.01)

(58) Field of Classification Search
CPC .. C02F 1/14; C02F 2103/08; C02F 2103/009; C02F 2303/10; B01D 1/0035; B01D 5/006; B01D 5/0075; B01D 5/009; H01L 31/0525; H01L 31/0543; H02S 40/22
See application file for complete search history.

(56) References Cited

U.S. PATENT DOCUMENTS

| | | | | |
|---|---|---|---|---|
| 3,501,381 A | * | 3/1970 | Delano | ............... B01D 1/0005 202/83 |
| 4,194,949 A | * | 3/1980 | Stark | ....................... F24S 23/30 202/180 |
| 4,209,363 A | * | 6/1980 | Ramer | ..................... C02F 1/14 202/180 |

(Continued)

*Primary Examiner* — Jonathan Miller
(74) *Attorney, Agent, or Firm* — Wenderoth, Lind & Ponack, L.L.P.

(57) ABSTRACT

An evaporation still for producing sea salt having a chamber that contains a bottom, a plurality of sides including a front side, a back side, a first side, and a second side, the front side and the back side being substantially parallel, and the first side and the second size being substantially parallel, and a top. The top contains a centered portion extending from the first side to the second side, the centered portion being substantially parallel to the front side and the back side, a first window extending in a downward slope from the centered portion towards the front side, and a second window extending in a downward slope from the centered portion towards the back side. The evaporation still also contains a plurality of legs. The first window extends from the centered portion beyond the front side such that condensation formed inside of the chamber drains outside of the chamber, and the second window extends from the centered portion beyond the back side such that condensation formed inside of the chamber drains outside of the chamber.

19 Claims, 3 Drawing Sheets

(56) References Cited

U.S. PATENT DOCUMENTS

| | | | | |
|---|---|---|---|---|
| 4,323,052 | A * | 4/1982 | Stark | C02F 1/14 |
| | | | | 136/246 |
| 5,067,272 | A * | 11/1991 | Constantz | A01G 25/00 |
| | | | | 202/234 |
| 6,274,004 | B1 * | 8/2001 | Andersen | C02F 1/14 |
| | | | | 203/1 |
| 6,342,127 | B1 * | 1/2002 | Possidento | B01D 5/0066 |
| | | | | 202/205 |
| 6,797,124 | B2 * | 9/2004 | Ludwig | C02F 1/14 |
| | | | | 203/DIG. 1 |
| 7,153,395 | B2 * | 12/2006 | Foster | C02F 1/14 |
| | | | | 203/DIG. 1 |
| 7,264,695 | B2 * | 9/2007 | Foster | C02F 1/14 |
| | | | | 203/DIG. 1 |
| 7,857,945 | B2 * | 12/2010 | Al-Garni | C02F 1/14 |
| | | | | 203/1 |
| 7,955,477 | B2 * | 6/2011 | Foster | C02F 1/14 |
| | | | | 159/32 |
| 8,088,257 | B2 * | 1/2012 | Kemp | B01D 1/0035 |
| | | | | 159/901 |
| 9,259,662 | B2 * | 2/2016 | Lee | B01D 1/0035 |
| 10,093,552 | B2 * | 10/2018 | Lee | H02S 40/425 |
| 10,183,233 | B1 * | 1/2019 | Haidar | B01D 3/008 |
| 10,233,095 | B1 * | 3/2019 | Haidar | B01D 1/0035 |
| 2002/0162733 | A1 * | 11/2002 | Foster | C02F 1/14 |
| | | | | 203/1 |
| 2008/0078670 | A1 * | 4/2008 | Al-Garni | B01D 1/0035 |
| | | | | 202/234 |
| 2015/0353379 | A1 * | 12/2015 | Lee | C02F 1/043 |
| | | | | 203/21 |

* cited by examiner

US 11,465,067 B2

EVAPORATION STILL AND ASSOCIATED METHODS OF PRODUCING SALT

TECHNICAL FIELD

The present application generally relates evaporation stills and associated methods of producing salt that use the evaporation stills.

BACKGROUND

The evaporation still for producing sea salt of the present description provides an environmentally friendly, safe, and economical way to harvest sea salt, and also provides an evaporation still achieves excellent quality salt crystals. Even though salt has been harvested from the sea for ages, known techniques have a number of problems. For instance, one technique for harvesting sea salt is the utilization of a salt evaporation pond, wherein shallow pools of salt water are exposed to the environment and allowed to evaporate. After the water evaporates, the remaining salt deposits are collected. Since these pools of salt water are exposed to the environment, the water and salt deposits can become contaminated by, for example, bird feces. Moreover, the evaporation process is unregulated, and thus can be inhibited by environmental factors, such as rain. Thus, even though good quality salt can be achieved by utilizing a salt evaporation pond, such ponds have a number of disadvantages and potential problems.

Similarly, more advances techniques, such as industrial distillation, kiln drying, boiling, and vacuum evaporation, etc. utilize large amounts of energy. As such, these processes are typically monitored in a careful manner and have complex installations, and are expensive to run and maintain.

BRIEF SUMMARY

In view of the above-mentioned exemplary problems with conventional and known salt production methods and apparatus, the present application provides evaporation stills and associated methods of producing sea salt that use the evaporation stills.

One aspect of the present application includes an evaporation still (1) for producing sea salt comprising: a) a chamber (2) comprising a bottom (3), a plurality of sides (4), and a top (5); and b) a plurality of legs (6), wherein the top comprises one or more windows (7).

In another aspect, the one or more windows (7) are affixed to the top via one or more movable joints (8) such that the one or more windows opens.

In another aspect, the one or more movable joints (8) are one or more hinges.

In another aspect, the one or more windows (7) comprises a plurality of window panes (9).

In another aspect, the one or more windows (7) forms a downward slope from the top to the side.

In another aspect, the plurality of sides (4) comprises a front side, a back side, a first side, and a second side, the front side and the back side being substantially parallel, and the first side and the second size being substantially parallel, wherein the top comprises a centered portion extending from the first side to the second side, the centered portion being substantially parallel to the front side and the back side, wherein a first window extends from the centered portion towards the front side, and wherein a second window extends from the centered portion towards the back side.

In another aspect, the first window forms a downward slope from the centered portion towards the front side, and the second window forms a downward slope from the centered portion towards the back side.

In another aspect, the first window extends from the centered portion beyond the front side such that condensation formed inside of the chamber (2) drains outside of the chamber, and the second window extends from the centered portion beyond the back side such that condensation formed inside of the chamber (2) drains outside of the chamber.

In another aspect, the one or more windows (7) comprises a transparent material.

In another aspect, the chamber (2) is a dark color.

In another aspect, the chamber (2) is insulated.

Another aspect of the present application includes an evaporation still (1) for producing sea salt comprising a) a chamber (2) comprising a bottom (3), a plurality of sides (4) comprising a front side, a back side, a first side, and a second side, the front side and the back side being substantially parallel, and the first side and the second size being substantially parallel, and a top (5) comprising a centered portion extending from the first side to the second side, the centered portion being substantially parallel to the front side and the back side, a first window extending in a downward slope from the centered portion towards the front side, and a second window extending in a downward slope from the centered portion towards the back side; and b) a plurality of legs (6), wherein the first window extends from the centered portion beyond the front side such that condensation formed inside of the chamber (2) drains outside of the chamber, and wherein the second window extends from the centered portion beyond the back side such that condensation formed inside of the chamber (2) drains outside of the chamber.

Another aspect of the present application is method of producing sea salt comprising introducing salt water into the evaporation still and allowing the salt water to evaporate.

In another aspect, the evaporation still is exposed to the sun thereby heating the evaporation still.

In another aspect, the evaporation still is exposed to the sun 4-6 days thereby heating the evaporation still.

Other objects, features and advantages of the present invention will be apparent to those of ordinary skill in the art in view of the following detailed description of the invention and accompanying drawings.

BRIEF DESCRIPTION OF THE DRAWINGS

The drawings as provided for herein set forth some exemplary embodiments of the evaporation stills and methods of the present application, the detailed description of which follows. The drawings are merely exemplary, and are clearly not intended to limit the invention.

DETAILED DESCRIPTION

The evaporation stills and methods of the present application are now described by reference to the embodiments.

The description provided herein is not intended to limit the scope of the claims, but to exemplify the variety encompassed by the present application. The embodiments are described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
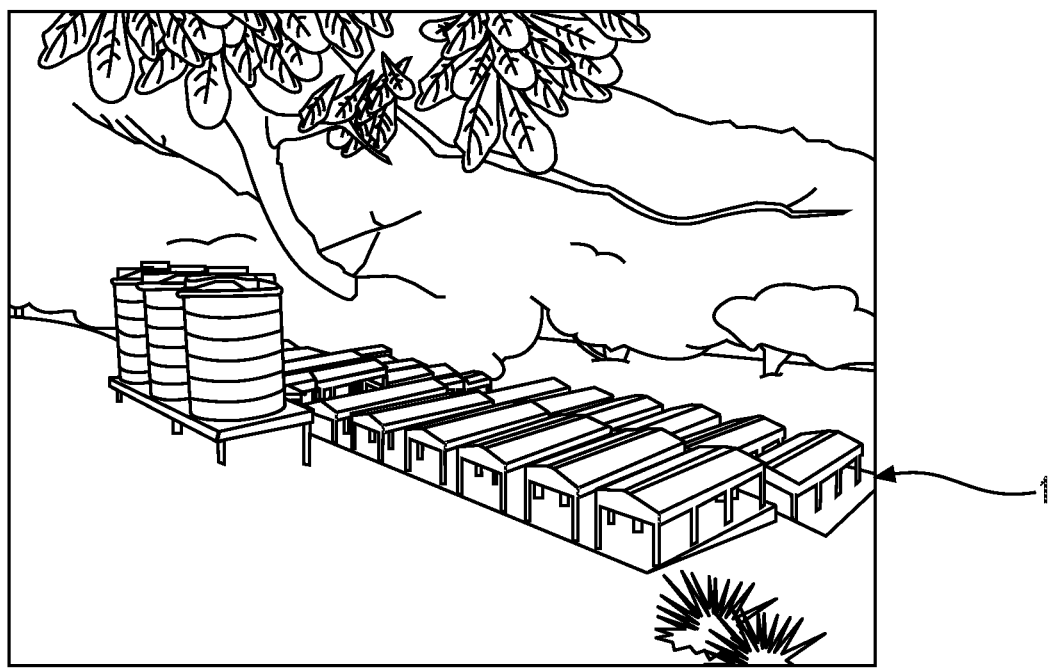
FIG. 1 is photograph of an embodiment of the evaporation stills.

As seen in FIG. 1, the evaporation stills (1) can be used individually or together with a plurality of evaporation stills. In FIG. 1, a number of the evaporation stills (1) are used together in an evaporation "farm" that is located in an environment that has sun exposure. The evaporation stills (1) are located below a number of tanks that contain seawater or other water than contains salt. However, the evaporation stills (1) could also be located near the source of the sea water and/or have the sea water pumped to the location of the the evaporation stills (1).

Figure 2:
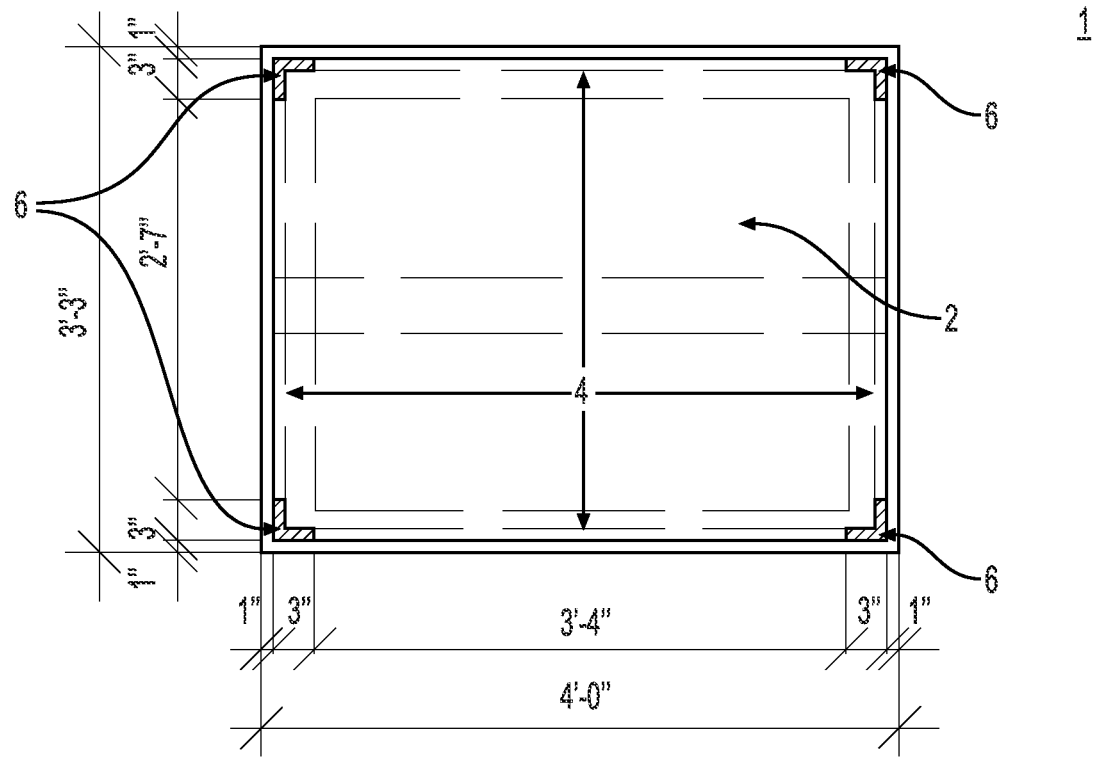
FIG. 2 is a bottom view of an embodiment of the evaporation stills.
Figure 3:
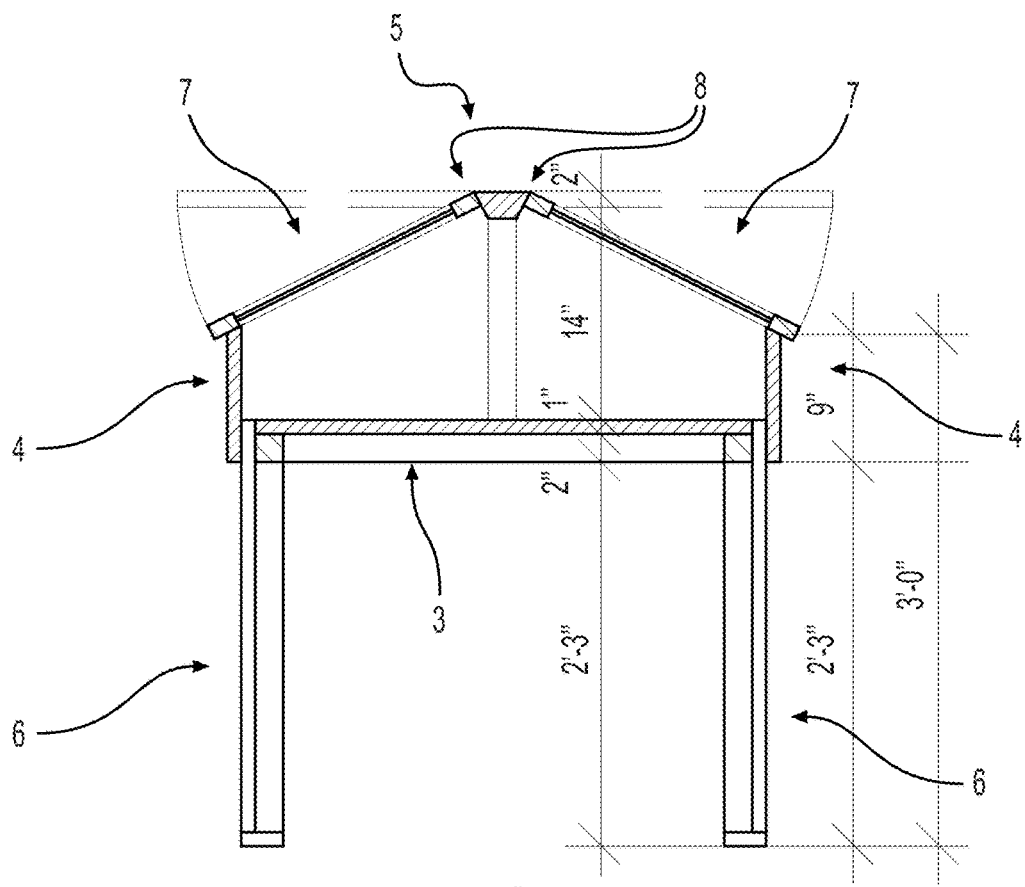
FIG. 3 is a side view of an embodiment of the evaporation stills.

FIG. 2 shows a bottom view of an embodiment of an evaporation still (1) for producing sea salt. FIG. 3 shows a side view of an embodiment of an evaporation still (1) for producing sea salt. In these Figures, the evaporation still (1) contains: a) a chamber (2) comprising a bottom (3), a plurality of sides (4), and a top (5); and b) a plurality of legs (6), wherein the top comprises one or more windows (7). The chamber (2) can hold an amount of water to facilitate evaporation. FIG. 3 shows an embodiment having a single chamber (2). However, the chamber (2) can be divided into 2, 3, 4, 5, 6, 7, 8, or more sub-chambers. The chamber (2) also can include internal supports. Also, the Figures provide exemplary embodiments of the evaporation still (1) by including, for example, the width indicated of 3'3" and 2'7". However, alternative embodiments, wherein, for example, the evaporation still (1) has a square shape, such as the width being 4'0" and 3'4" are acceptable.

Figure 5:
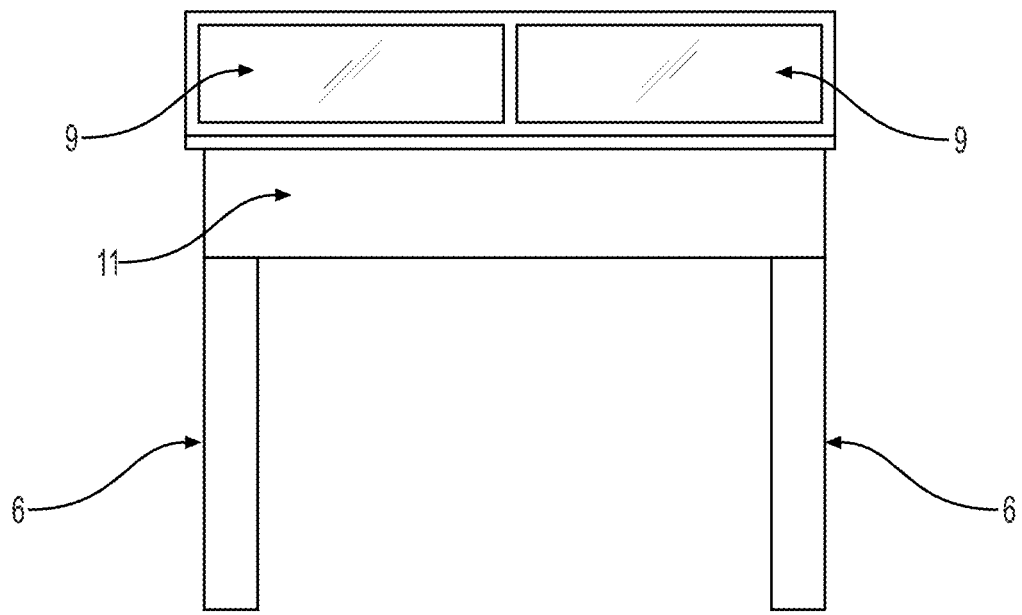
FIG. 5 is a side view of an embodiment of the evaporation stills.
Figure 6:
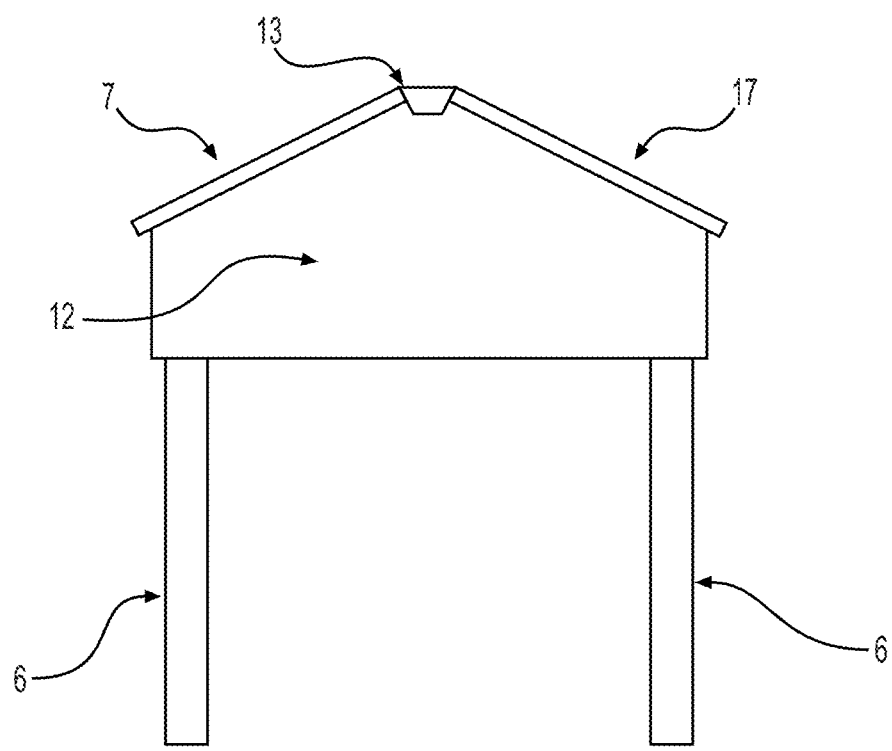
FIG. 6 is a side view of an embodiment of the evaporation stills.

The plurality of sides (4) can include a front side, a back side, a first side, and a second side. The front side and the back side can be substantially parallel. The front side and the back side can be substantially the same dimensions. FIG. 5 shows an embodiment having a front side (11). The first side and the second side can be substantially parallel. The first side and the second side can be substantially the same dimensions. FIG. 6 shows an embodiment having a first side (12). The top (5) can contain a centered portion (13) extending from the first side to the second side. The centered portion (13) being substantially parallel to the front side and the back side. While the centered portion (13) can be generally centered between the front side and the back side, the centered portion (13) can be off-set such that the centered portion is closer to either the front side or the back side.

As seen in FIG. 3, the one or more windows (7) can be affixed to the top (5) via one or more movable joints (8) such that the one or more windows opens. The movable joints (8) can any type of joint that is movable and affixes the one or more windows (7) to the top (5), such as a hinge or tape joint. Further, in the embodiment shown in FIG. 3, the one or more windows (7) forms a downward slope from the top (5) to the side (4). Such a slope allows rain water to flow off the glass, but also allows condensation from inside of the chamber (2) to flow out of the evaporation still (1). The angle of the slope in FIG. 3 is approximately 65°, but other angles, such as 5°, 15°, 25°, 35°, 45°, 55°, 75°, and 85° can function appropriately. One or more drainage/collection vessels, for example "half-pipes," can run along the bottom of each side below the lower sloped window sections to collect the condensed water that drips from the downward sloped glass of the the one or more windows (7). The drainage/collection vessels can be connected, for example by plumbing fittings such as "tees," that are connected together in order to direct the flow of the desalinated water into a holding tank. The drainage/collection vessels can interconnect a plurality of the evaporation stills (1) or be used individually. Further, within the evaporation stills (1) one or more trays can be included to hold the salt water. For example, FDA approved polyethelene trays can be used in each still to hold the seawater that is evaporating.

Figure 4:
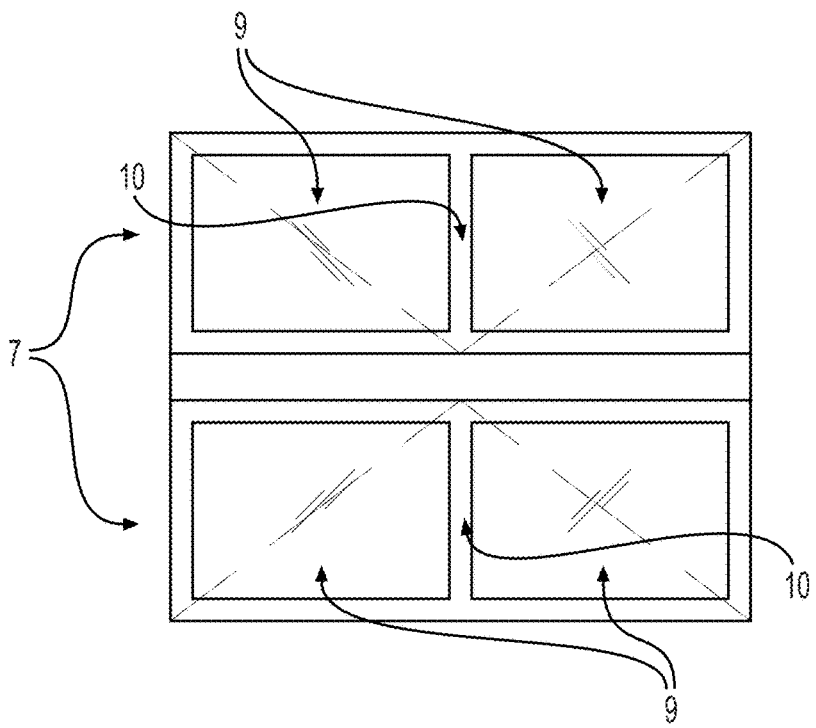
FIG. 4 is a top view of an embodiment of the evaporation stills.

FIG. 4 shows a top view of an embodiment of an evaporation still (1). In this embodiment, the one or more windows (7) comprises a plurality of window panes (9), such as two window panes per window. FIG. 5 also shows an embodiment having a plurality of window panes (9). However, a single window pane could also be appropriately used, or even more than two window panes. In an embodiment, three window panes are used per window (7). The one or more windows (7) is generally constructed of a frame and a window pane, wherein the frame can include, but does not require, a support bar (10). Further, the one or more windows (7) can be made of a translucent materials, such as glass, acrylic, etc. The window panes (9) can also be made of a translucent materials, such as glass, acrylic, etc. The translucent materials can also be tinted.

As seen in FIG. 6, the windows can extends from a centered portion of the top beyond the side such that condensation formed inside of the chamber (2) drains outside of the chamber. FIG. 6 shows an embodiment that contains two windows each extending from the centered portion of the top in downward slope towards their respective sides. Even though FIG. 6 shows the downward slope being approximately the same, the downward slope is not required to be the same. Instead, the downward slope of one side could differ from the other side to, for example, ensure good placement in the sun.

Since the evaporation still (1) can be solar powered, the evaporation still (1) can have a dark color, such as black, brown, green, etc. The dark color helps to capture energy from the sun and heat the evaporation still (1). However, supplemental heating from, for example, a heating element could be added. Additionally, the color of the inside and outside of the evaporation still (1) can be the same or different. The evaporation still (1) can also be insulated. Insulating the evaporation still (1) allows the evaporation still (1) to maintain an elevated temperature. For instance, when the sun sets, the temperature of the evaporation still (1) could decrease, but such a decrease in temperature and subsequent delay in increase in temperature can be minimized by insulation.

The evaporation still (1) can be used to produce sea salt. The method of producing sea salt involves introducing salt water into the evaporation still (1) and allowing the salt water to evaporate. The salt water can be obtained from natural sources, such as the ocean. Brackish water can also be utilized or even prepared brines. The evaporation still (1) is exposed to the sun thereby heating the evaporation still. Such heat causes the rate of evaporation to increase relative to the rate of evaporation at environmental conditions. The rate can be controlled by opening and closing the windows on the evaporation still (1). The evaporation still (1) is exposed to the sun 4-6 days thereby heating the evaporation still. However, the amount of time can vary depending upon the outside temperature and amount of sunlight. Additionally, supplemental heating can be used, if desired.

By allowing the salt water to evaporate, a brine is produced. The brine has an increased amount of salt relative to the water due to the evaporation of the water. In an embodiment, the salt water evaporates in the evaporation still (1) for 4-6 sunny days at an outside temperature of 80° F. to 85° F. to produce the salt-concentrated brine. After the brine is produced, the brine can be transferred onto screens that are over trays, but housed in dedicated evaporation stills. The brine then completely dries into sea salt with the help of gravity and the continued heat from the sun in the stills. In an embodiment, such a secondary evaporation takes approximately 2 days.

In the foregoing description, the evaporation stills and methods of the present application have been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification, unless the context requires otherwise, the word "comprise" and its variations, such as "comprises" and "comprising," will be understood to imply the inclusion of a stated item, element or step or group of items, elements or steps, but not the exclusion of any other item, element or step or group of items, elements or steps. Furthermore, the indefinite article "a" or "an" is meant to indicate one or more of the item, element or step modified by the article.

The invention claimed is:

1. An evaporation still (1) for producing sea salt comprising:
   a) a chamber (2) comprising a bottom (3), a plurality of sides (4), and a top (5); and
   b) a plurality of legs (6),
   wherein the chamber (2) is a dark color,
   wherein the plurality of sides (4) comprises a front side, a back side, a first side, and a second side, the front side and the back side being substantially parallel, and the first side and the second side being substantially parallel,
   wherein the top (5) comprises a centered portion extending from the first side to the second side, the centered portion being substantially parallel to the front side and the back side,
   wherein a first window extends from the centered portion towards the front side such that the first window forms a first downward slope from the centered portion to the front side, the first downward slope being in the range of 15 to 75°, the first window being affixed to the top (5) via one or more movable joints (8) such that the first window opens, the first window extending from the centered portion beyond the front side such that condensation formed inside of the chamber (2) drains outside of the chamber, and
   wherein a second window extends from the centered portion towards the back side such that the second window forms a second downward slope from the centered portion to the second side, the second downward slope being in the range of 15 to 75°, the second window being affixed to the top (5) via one or more movable joints (8) such that the second window opens, the second window extending from the centered portion beyond the back side such that condensation formed inside of the chamber (2) drains outside of the chamber.

2. The evaporation still (1) for producing sea salt of claim 1, wherein the first downward slope is approximately 15° and the second downward slope is approximately 15°.

3. The evaporation still (1) for producing sea salt of claim 1, wherein the one or more movable joints (8) are one or more hinges.

4. The evaporation still (1) for producing sea salt of claim 1, wherein the first window comprises a plurality of window panes (9), and wherein the second window comprises a plurality of window panes (9).

5. The evaporation still (1) for producing sea salt of claim 1, wherein the first window comprises a transparent material and the second window comprises a transparent material.

6. The evaporation still (1) for producing sea salt of claim 1, wherein the chamber (2) is insulated.

7. The evaporation still (1) for producing sea salt of claim 1, wherein the chamber (2) is divided into 2 or more sub-chambers via internal supports.

8. The evaporation still (1) for producing sea salt of claim 1, wherein the evaporation still further comprises a front side collection vessel on an exterior of the front side such that front side collection vessel collects condensation that drips from the first window, and a back side collection vessel on an exterior of the back side such that back side collection vessel collects condensation that drips from the second window.

9. The evaporation still (1) for producing sea salt of claim 1, wherein the chamber (2) further comprises a tray for holding seawater.

10. The evaporation still (1) for producing sea salt of claim 1, wherein the chamber (2) further comprises a heating element.

11. A method of producing sea salt comprising introducing salt water into the evaporation still of claim 1 and allowing the salt water to evaporate.

12. The method of producing sea salt of claim 11, wherein the evaporation still is exposed to the sun thereby heating the evaporation still.

13. The method of producing sea salt of claim 11, wherein the evaporation still is exposed to the sun for 4-6 days thereby heating the evaporation still.

14. An evaporation still (1) for producing sea salt consisting of:
   a) a chamber (2) consisting of a bottom (3), a plurality of sides (4), a top (5), a first window, and a second window; and
   b) a plurality of legs (6),
   wherein the chamber (2) is a dark color,
   wherein the plurality of sides (4) consists of a front side, a back side, a first side, and a second side, the front side and the back side being substantially parallel, and the first side and the second side being substantially parallel,
   wherein the top (5) consists of a centered portion extending from the first side to the second side, the centered portion being substantially parallel to the front side and the back side,
   wherein the first window extends from the centered portion towards the front side such that the first window forms a first downward slope from the centered portion to the front side, the first downward slope being in the range of 15 to 75°, the first window being affixed to the top (5) via one or more movable joints (8) such that the first window opens, the first window extending from the centered portion beyond the front side such that condensation formed inside of the chamber (2) drains outside of the chamber, wherein the second window extends from the centered portion towards the back side such that the second window forms a second downward slope from the centered portion to the second side, the second downward slope being in the range of 15 to 75°, the second window being affixed to the top (5) via one or more movable joints (8) such that the second window opens, the second window extending from the centered portion beyond the back side such that condensation formed inside of the chamber (2) drains outside of the chamber, and wherein the evaporation still optionally further consists of a tray for holding seawater, a heating element, a front side collection vessel, and/or a back side collection vessel.

15. The evaporation still (1) for producing sea salt of claim 14, wherein the first downward slope is approximately 15° and the second downward slope is approximately 15°.

16. The evaporation still (1) for producing sea salt of claim 14, wherein the front side collection vessel is on an exterior of the front side such that front side collection vessel collects condensation that drips from the first window, and a back side collection vessel is on an exterior of the back side such that back side collection vessel collects condensation that drips from the second window.

17. A method of producing sea salt comprising introducing salt water into the evaporation still of claim 14 and allowing the salt water to evaporate.

18. The method of producing sea salt of claim 14, wherein the evaporation still is exposed to the sun thereby heating the evaporation still.

19. The method of producing sea salt of claim 14, wherein the evaporation still is exposed to the sun for 4-6 days thereby heating the evaporation still.

\* \* \* \* \*